US006466767B1

(12) United States Patent
Lidbrink et al.

(10) Patent No.: US 6,466,767 B1
(45) Date of Patent: Oct. 15, 2002

(54) METHOD AND DEVICE IN TELECOMMUNICATION SYSTEM

(75) Inventors: Stefan Lidbrink, Stockholm; Kenneth Schönfeldt, Ursviken; Björn Lindquist, Bjärred; Kar-Fat Poon, Vellinge; Kenneth Ekman, Skellefteå; Niclas Ögren, Skelleftehamn, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/149,627

(22) Filed: Sep. 8, 1998

(30) Foreign Application Priority Data

Sep. 8, 1997 (SE) ................................ 9703224

(51) Int. Cl.[7] ............................................. H04B 17/00
(52) U.S. Cl. ...................... 455/67.1; 455/423; 455/425
(58) Field of Search .......................... 455/67.1, 418, 455/419, 420, 424, 425, 426, 39, 67.4, 68, 69, 226.1, 423; 375/135, 146, 213, 219, 224, 229, 233

(56) References Cited

U.S. PATENT DOCUMENTS

| 4,415,770 | A | * | 11/1983 | Kai et al. ....................... 179/2 |
| 4,443,661 | A | * | 4/1984 | Kubo ....................... 379/29.01 |
| 4,829,554 | A | * | 5/1989 | Barnes et al. ................. 379/58 |
| 4,977,399 | A | * | 12/1990 | Price et al. ................. 340/7.21 |
| 5,293,640 | A | | 3/1994 | Gunmar et al. ............ 455/33.1 |
| 5,404,572 | A | * | 4/1995 | Ishii ........................... 359/145 |
| 5,450,615 | A | | 9/1995 | Fortune et al. ............ 455/67.6 |
| 5,577,265 | A | * | 11/1996 | Wheatley, III ............. 455/33.3 |
| 5,603,095 | A | * | 2/1997 | Uola ......................... 455/67.1 |
| 5,613,217 | A | | 3/1997 | Hagstrom et al. ......... 455/67.1 |
| 5,623,485 | A | * | 4/1997 | Bi ............................... 370/209 |
| 5,742,589 | A | * | 4/1998 | Murata ....................... 370/249 |
| 5,790,957 | A | * | 8/1998 | Heidari ...................... 455/412 |
| 5,909,641 | A | * | 6/1999 | Simmons .................... 333/103 |
| 5,943,617 | A | * | 8/1999 | Nakamura .................. 375/225 |
| 5,973,643 | A | * | 10/1999 | Hawkes et al. ............ 342/457 |
| 6,035,001 | A | * | 3/2000 | Eklund et al. ............. 375/316 |
| 6,111,923 | A | * | 8/2000 | Mueller et al. ............ 375/341 |

FOREIGN PATENT DOCUMENTS

GB          2232850 A          3/1989          ............ H04Q/7/04

* cited by examiner

*Primary Examiner*—William Trost
*Assistant Examiner*—Congvan Tran
(74) *Attorney, Agent, or Firm*—Burns, Doane, Swecker & Mathis, L.L.P.

(57) ABSTRACT

A test transmitter for verifying the positioning of antennas in a mobile telecommunications system and a method for manufacturing such a test transmitter that is particularly suited for indoor use are presented. A mobile terminal is modified so that it can transmit in the downlink frequency band, and preferably so that it can transmit one or more of the signal types used for downlink signalling in the mobile telecommunications system.

28 Claims, 10 Drawing Sheets

| |
|---|
| FCCH |
| SCH |
| BCCH |
| BCCH |
| BCCH |
| BCCH |
| CCCH |
| CCCH |
| CCCH |
| CCCH |
| FCCH |
| SCH |
| CCCH |
| CCCH |
| CCCH |
| CCCH |
| CCCH |
| CCCH |
| CCCH |
| CCCH |
| FCCH |
| SCH |
| CCCH |
| CCCH |
| CCCH |
| CCCH |
| CCCH |
| CCCH |
| CCCH |
| CCCH |
| FCCH |
| SCH |
| CCCH |
| CCCH |
| CCCH |
| CCCH |
| CCCH |
| CCCH |
| CCCH |
| CCCH |
| FCCH |
| SCH |
| CCCH |
| CCCH |
| CCCH |
| CCCH |
| CCCH |
| CCCH |
| CCCH |
| CCCH |
| IDLE |

FIG. 5B

METHOD AND DEVICE IN TELECOMMUNICATION SYSTEM

BACKGROUND

The present invention relates to the design and construction of mobile telephone systems. In particular it relates to a test transmitter for verifying the positioning of antennas in such a system and a method for manufacturing such a test transmitter.

Mobile telephony systems for indoor use are being used to an increasing extent. A common and practical solution for the implementation of indoor mobile telephony systems is to use a distributed antenna system with several antennas, each transmitting with a low output power, connected to one Radio Base Station (RBS). Ideally, the antennas should be distributed in the building in such a way as to enable a 100% coverage. At the same time, the number of antennas should be kept as low as possible for economic and other reasons.

One of the main problems when designing the distributed antenna system is to decide where the antennas should be positioned. To aid in this, the designers may rely completely on experience, or a prediction tool may be used. A prediction tool is a computer based tool that simulates the actual environment in which the antennas are to be placed, based on mathematical models. A digital "map" of the area is shown, and parameters such as wall attenuation and the signal power of the antennas may be set. Antennas are placed in the simulated environment and the signal power is measured in a number of points in the space. While measuring, the parameters may be changed, antennas may be moved in the simulated environment, etc.

Neither experience nor prediction tools will give a perfect result. Parameters such as wall attenuation and radio wave interference have to be estimated or predicted, and the estimates will deviate more or less from the real values. As the number of users of indoor mobile telephony systems increases, so does the need for proper planning of the indoor cells.

Therefore, the antenna positions should be verified before the installation of the whole system. There is a need for a verification system enabling quick and easy verification of the distribution of antennas at a low cost, while still producing a reliable result.

It is possible to verify the cell plan before the installation of the antennas, by use of a Continuous Wave (CW) test transmitter and a test receiver, using analogue Radio Frequency (RF) signals. The test transmitter is positioned where the base station or antenna is to be placed, and the signal from the test transmitter is registered in different positions using a test receiver.

Today a number of test radio network cells exist for outdoor use, for example the PCS-20 and the Cell-20 from Moffet, Larson & Johnson, Inc. (MLJ) or the TS9953 from Rohde & Schwarz. These test cells are all fairly large and heavy, typically 10–30 kg, and cumbersome to move around, and thus are not suitable for indoor use.

They are also quite expensive, and require considerable manual operation, which limits the number of test transmitters that can be used.

One test transmitter from MLJ, intended for indoor use, has a transmit power of up to 1 W and weighs 0.7 kg.

All of the above mentioned test transmitters transmit only a continuous wave, with no information modulated onto it. Thus, the signal from such a test transmitter cannot be distinguished from any other signals, which causes problems in areas where signals from other signal sources also occur. When testing an indoor antenna configuration, it is desirable to be able to test the whole configuration in one operation. This requires that the signals from the different test transmitters can be distinguished from each other, which is not possible if each transmitter only transmits a continuous wave.

A continuous wave transmitter from Rohde & Schwarz, TS9953, may be combined with GSM test equipment TS9951 or TS9958. This test equipment simulates GSM downlink signals, which are modulated onto the continuous wave and transmitted. In this way, each transmitter can be made to transmit a unique signal. Thus, two units are needed. The continuous wave transmitter is rack mounted, and it is impossible for one person to transport it. The output power may be set to 20, 50 or 100 W, and it is clearly not suitable for indoor use.

Normally, when testing the antenna or base station configuration, only one test transmitter is used. This test transmitter is placed at the location planned for an antenna. The test transmitter, which is quite heavy, must be transported to the appropriate location and the antenna must be installed. The signal power in different positions around the antenna is measured. The test transmitter is then moved to a new location, the antenna is installed and measurements are made again. It is not feasible for practical and economical reasons, to use more than one test transmitter at a time. Thus, in practice, the antenna configuration is never tested as a whole.

Also, the power supply is a problem: either an adapter must be used to connect to the mains, or a battery must be used, which is in itself heavy and has limited capacity.

SUMMARY

It is an object of the invention to provide a cell test device for cellular telecommunications systems that is easy to use.

It is another object of the invention to provide a cell test device for cellular telecommunications systems that is suitable for indoor use.

It is another object of the invention to provide a cell test device that allows the testing of the whole antenna configuration in one operation.

It is yet another object of the invention to provide a cell test device for cellular telecommunications systems that is easily portable.

It is still another object of the invention to provide a cell test device for cellular telecommunications systems that allows a very precise positioning of antennas for optimizing the antenna distribution.

It is another object of the invention to provide a cell test device for cellular telecommunications systems that is flexible and inexpensive compared to prior art cell test devices.

These and other objects are achieved by the present invention by a test transmitter for a mobile telecommunications system comprising base stations transmitting in a downlink frequency band and portable units for receiving and transmitting, transmitting in an uplink frequency band, said portable units each comprising a portable unit casing, a portable unit transmitter part and a portable unit receiver part, said transmitter part comprising a portable unit microphone, a portable unit channel coding unit, a portable unit interleaving unit, a portable unit modulator unit, a portable unit transmitter unit adapted to the uplink frequency band, and a portable unit antenna, said test transmitter comprising a unit for generating a data stream, a said portable unit modulator unit and a transmitter unit adapted to the downlink frequency band.

In a preferred embodiment, the test transmitter also comprises a said portable unit channel coding unit and a said portable unit interleaving unit. It may be comprised in a said portable unit casing, and may be connectable to all standard peripheral equipment used with said portable units, such as batteries, amplifiers and antennas.

In a preferred embodiment the mobile test transmitter is based on a standard mobile telephone, which is modified to perform the functions required by a test transmitter.

The teachings of the invention are applicable to any type of mobile telephone, including Time Division Multiplex Access (TDMA), Code Division Multiplex Access (CDMA) and Frequency Division Multiplex Access (FDMA).

The invention offers the following advantages:

The mobile test transmitter is small, light, easily portable and can be used with standard mobile telephone accessories, that is, it is easy to use in field measurements.

It is possible to alter the content of the transmitted signal, thus giving a signal that may be identified even in an area with many different signal sources.

The signal produced by the mobile test transmitter is the same signal as transmitted by a base station and will therefore be perceived as a base station by a mobile telephone, thus enabling measurements with standard radio network measurement tools.

The low cost and small size of the mobile test transmitter according to the invention, and the possibility to vary the transmitted signal enables the use of several mobile test transmitters at the same time, and thus enables the testing of the whole combination of antennas in one operation. This also makes it easy to change the position of one or more antennas while testing.

Standard peripheral equipment for mobile telephones, such as batteries and antennas, may be used together with the mobile test transmitter.

The receiver functions in a mobile telephone may be used to make the test transmitter a combined transmitter/receiver.

A device that can mimic a control channel broadcast signal from a base station, may be used to create events in an existing mobile telephone environment for test purposes. The mobile test transmitter will serve as a portable radio network cell for test purposes.

A Man-Machine Interface (MMI) is provided in an easy manner by use of the standard display and keypad of the mobile telephone, or by connecting the mobile test transmitter to a Personal Computer (PC) comprising control software.

DETAILED DESCRIPTION

According to the invention, one or more mobile test transmitters are used instead of base stations, or antennas connected to a base station, to test the configuration of base stations, or antennas, before the installation is completed.

As a mobile test transmitter, any ordinary mobile telephone suitable for use within the frequency bands concerned, may be used, with certain hardware and software modifications as explained below. Any kind of antenna, omnidirectional or unidirectional, may be connected to the mobile test transmitter according to the invention, through the ordinary external antenna connection.

Figure 1:
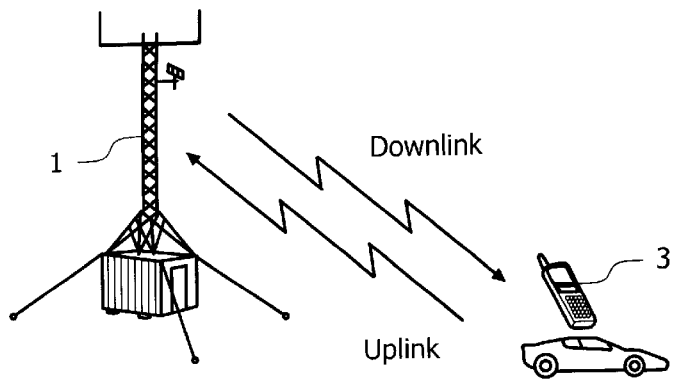
FIG. 1 shows the basic principles for communication between a base station, or an antenna, and a mobile terminal.

FIG. 1 shows the transmission between a base station 1 and a mobile terminal 3 in a mobile telephone network. The transmission direction from the base station 1 to the mobile terminal 3 is referred to as the downlink, or forward, direction. The transmission direction from the mobile terminal 3 to the base station 1 is referred to as the uplink, or reverse, direction. Normally, different frequency bands are used for downlink and uplink transmission. This is referred to as Frequency Division Duplex (FDD). Time Division Duplex (TDD), in which the same frequencies are used in both directions but at different times, is rarely used.

For three important Time Division Multiplex Access (TDMA) systems, the frequencies for downlink and uplink transmission, respectively, are shown in the table below:

|  | GSM | DCS 1800 | PCS 1900 |
| --- | --- | --- | --- |
| Uplink | 890–915 MHz | 1710–1785 MHz | 1850–1910 MHz |
| Downlink | 935–960 MHz | 1805–1880 MHz | 1930–1990 MHz |

The North American Digital Cellular standards uses the following frequency bands for CDMA and TDMA in cellular systems and PCS systems, respectively:

|  | Cellular | PCS |
| --- | --- | --- |
| Uplink | 824–849 MHz | 1850–1910 MHz |
| Downlink | 869–894 MHz | 1930–1990 MHz |

An example of an FDMA system is the Nordic Mobile Telephone (NMT) systems, NMT 450 and NMT 900, which use the following frequencies:

|  | NMT 450 | NMT 900 |
| --- | --- | --- |
| Uplink | 453–458 MHZ | 890–915 MHz |
| Downlink | 463–468 MHz | 935–960 MHz |

Thus, practically all mobile telephones are adapted to transmit in one frequency band, the uplink frequency band, and receive signals in another frequency band, the downlink frequency band. Also, the signal formats used are not necessarily the same in both directions. According to the invention, to function as a mobile test transmitter, the mobile telephone must be modified so that it can transmit in the downlink frequency band, that is, it must be able to simulate a base station, or an antenna. It must at least be able to transmit a signal in the downlink frequency band. In a preferred embodiment, the mobile test transmitter is enabled to transmit one or more of the control signals used in downlink signalling. The modifications needed are described in more detail below.

Figure 2A:
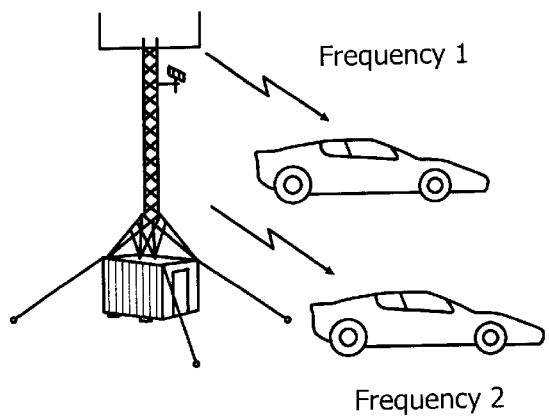
FIGS. 2A and 2B show the principles for TDMA and FDMA communication, respectively.

FIG. 2A shows the basic principle for signalling in a Frequency Division Multiplex Access (FDMA) system. One carrier frequency is assigned to each connection between a base station and a mobile terminal.

Figure 2B:
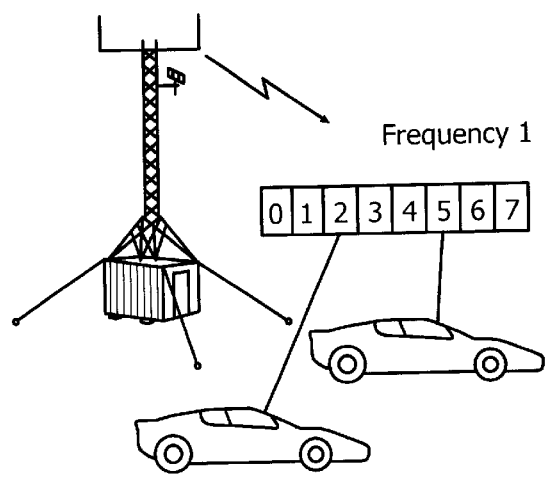

FIG. 2B shows the basic signalling principle for Time Division Multiplex Access (TDMA) systems. A number of channels, usually eight, share the same carrier frequency by means of time division multiplexing.

In FIGS. 2A and 2B, only the downlink channel is shown. In both cases there is a corresponding set of channels in the uplink direction.

In the following, the signalling principles used in TDMA systems and CDMA systems will be described in more detail.

Signalling in TDMA Systems

Figure 3:
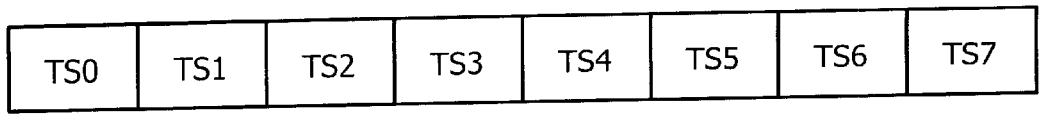
FIG. 3 shows the basic structure of a TDMA frame.

In a TDMA system, each carrier frequency is divided into a number of time slots. In this example, as shown in FIG. 2B, there are eight time slots, TS0, TS1, . . . , TS7. These eight time slots make up one TDMA frame, as shown in FIG. 3. 26 or 51 frames make up one multiframe. The same time slot in a sequence of frames, e.g. time slot 0 in all the frames, is referred to as a physical channel.

One physical channel may be used, at different times, for transmission of different logical channels. Logical channels may be either traffic channels carrying payload or control channels carrying different kinds of control information. One telephone call uses one physical channel for transmission in each direction for the duration of the talk.

The information on the control channels is carried in bursts. A burst comprises the information in the same time slot in a sequence of frames of predefined length. The different types of bursts are shown, somewhat simplified, in FIGS. 4A–4E.

Figure 4A:
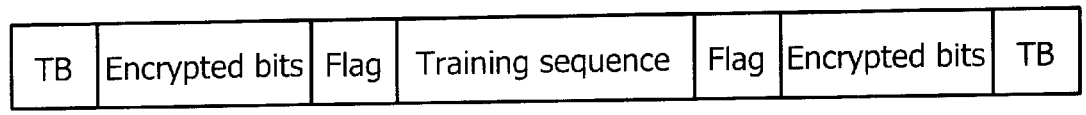
FIGS. 4A–4E show the basic structure of different types of bursts according to TDMA signalling.

FIG. 4A shows the normal burst, which is used to carry information on traffic channels and on certain control channels, such as BCCH and PCH. The first eight bits are tail bits TB, which signify a start point. The following bit sequence carries encrypted data or speech. Then follows a training sequence, that is, a specified bit pattern used by the equalizer to create a channel mode and another sequence of encrypted data or speech. The last eight bits are again tail bits TB, this time signifying a stop point. The tail bits are always set to 0, 0, 0.

Figure 4B:
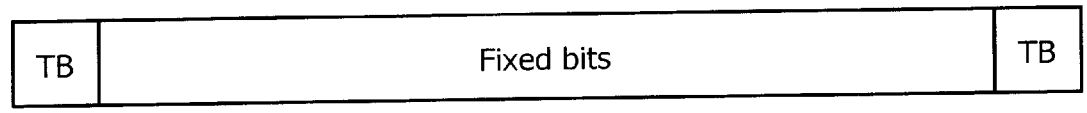

FIG. 4B shows the frequency correction burst, which is used for frequency synchronization of the mobile terminal. Eight tail bits TB are followed by a sequence of fixed bits and eight more tail bits TB.

Figure 4C:
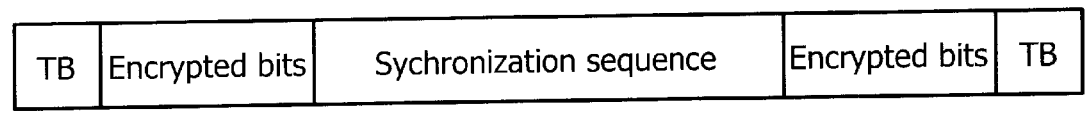

FIG. 4C shows the synchronization burst, which is used for the time synchronization of the mobile terminal. It contains eight tail bits TB, a sequence of encrypted bits, a long synchronization sequence another sequence of encrypted bits and eight more tail bits. The encrypted sequences carry the information of the TDMA Frame Number (FN) and Base Station Identity Code (BSIC).

Figure 4D:
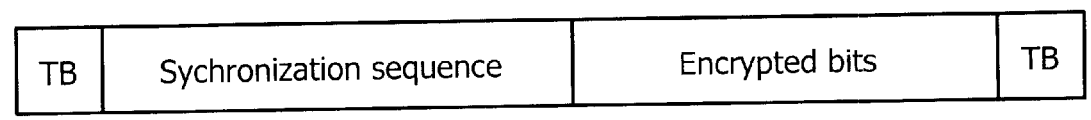

FIG. 4D shows the access burst, which is used for uplink signalling at random access and handover access. The access burst comprises eight tail bits TB followed by a synchronization sequence, a sequence of encrypted bits and eight more tail bits TB.

Figure 4E:
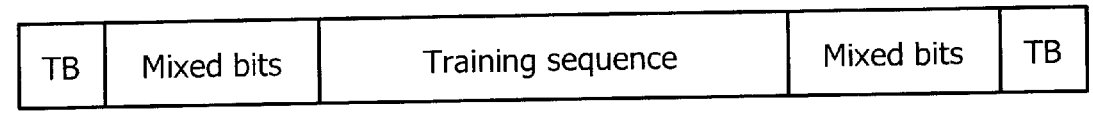

FIG. 4E shows the dummy burst, which is transmitted on the BCCH carrier frequency when no other information is to be transmitted on this frequency. Eight tail bits TB are followed by a sequence of mixed bits, a training sequence, another sequence of mixed bits and eight more tail bits TB. The dummy burst carries no information.

The logical channels relevant to the invention are as follows:

The Broadcast Control Channel (BCCH) and the Paging Channel (PCH) are transmitted as normal bursts, as shown in FIG. 4A. BCCH comprises general information about the cell, and PCH is used to page a mobile terminal.

The Frequency Correction Channel (FCCH) is used for frequency correction, and consists of repeated frequency correction bursts, as shown in FIG. 4B.

The Synchronization Channel (SCH) is used for frame synchronization and identification of the transceiver station. It consists of repeated synchronization bursts, as shown in FIG. 4C.

In idle mode, the downlink transmission, that is, from the base station to the mobile terminal, normally comprises normal bursts (BCCH and PCH), frequency correction bursts (FCCH), synchronization bursts (SCH) and dummy bursts.

A mobile terminal is normally only capable of transmitting normal bursts and access bursts. According to a preferred embodiment of the invention, the mobile test transmitter is enabled to transmit four channels: BCCH, PCH, FCCH and SCH.

Figure 5A:
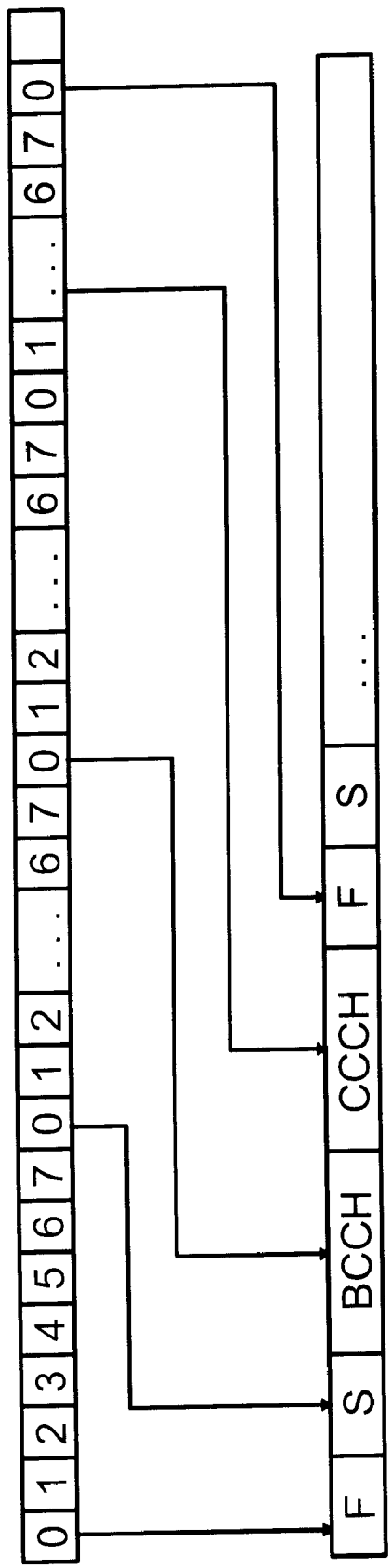
FIG. 5 shows the principles for the transmission of the most important control channels according to TDMA signalling, using GSM as an example.

FIG. 5A shows the principles for the downlink control signalling that takes place in time slot 0 of channel $C_0$ according to the GSM protocols. The physical channel defined by this time slot comprises the following channels: FCCH, SCH, BCCH, as defined above, and the Common Control Channel (CCCH), which comprises the PCH.

FIG. 5B shows the mapping of the control channels FCCH, SCH, BCCH and CCCH in a non-combined cell in GSM, as an example of a TDMA system. An FCCH frame is followed by an SCH frame, four BCCH frames and four CCCH frames. Then, the following pattern occurs four times: One FCCH frame, one SCH frame, four BCCH frames and four CCCH frames. The sequence ends with an idle frame.

Signalling in a CDMA System

In CDMA signalling, noise-like carrier waves are used, in order to reduce the negative effects of interference between users in the network.

To achieve this noise-like carrier wave, a conventional waveform is spread by multiplying it by a pseudo-noise ±1 binary sequence in the transmitter before being transmitted. In the receiver, the received signal is multiplied by a replica of the ±1 binary sequence to obtain the original signal.

Before transmission, both forward and reverse signals are spread by certain codes, here referred to as short codes, in a quadrature fashion, that is, from a single binary bit flow, two binary sequences, one in-phase and one quadrature, are generated by mod 2 addition of the short code pseudo-noise sequences.

Generally, in mobile telephony it is assumed that the power transmitted by a base station or a mobile terminal is constant. The signal power received by a user located near a base station and a user located farther away may then be very different. The signal to noise ratio of different users may then differ by several tens of decibels. In order for all users to receive an acceptable signal to noise ratio, the spreading bandwidth would have to be very high, thus reducing the spectral efficiency so much that the CDMA technology would be of no commercial use.

The solution to the problem outlined above, is to control the transmitted power in such a way that the received power from all users are substantially equal. If the received power is controlled, the subscribers can share the same frequency band without causing too much interference.

To reduce the average transmitted power, discontinuous transmission may be used.

Downlink Signalling

Several users share one carrier frequency. One carrier frequency can comprise up to 64 logical channels, each used by one network user. To avoid interference between users, the channels are made mutually orthogonal.

In the downlink direction there are three overhead channels in addition to the traffic channels, namely the pilot channel, the sync channel and the paging channel.

The pilot channel is used as a demodulation reference for the mobile terminals and for handover level measurements. It consists of pure short code and carries no information. The relative amplitude of the pilot channel signal and its spatial distribution must be carefully controlled, as they control handover boundaries between base stations.

All stations use the same short code. Therefore, the pilot signals from different stations are distinguished from each other only by their phases.

The sync channel carries a repeating message that identifies the station and the absolute phase of the pilot sequence and conveys timing and system configuration information to the mobile terminals.

The paging channel is used for communicating with mobile terminals when they are not assigned to a traffic channel. Its primary purpose is to convey notifications of incoming calls to the mobile terminals.

Traffic channels are assigned dynamically when requested by a mobile terminal. The paging channel is used to inform the mobile terminal about the traffic channel to use. The traffic channel also comprises one power control subchannel.

Figure 6:
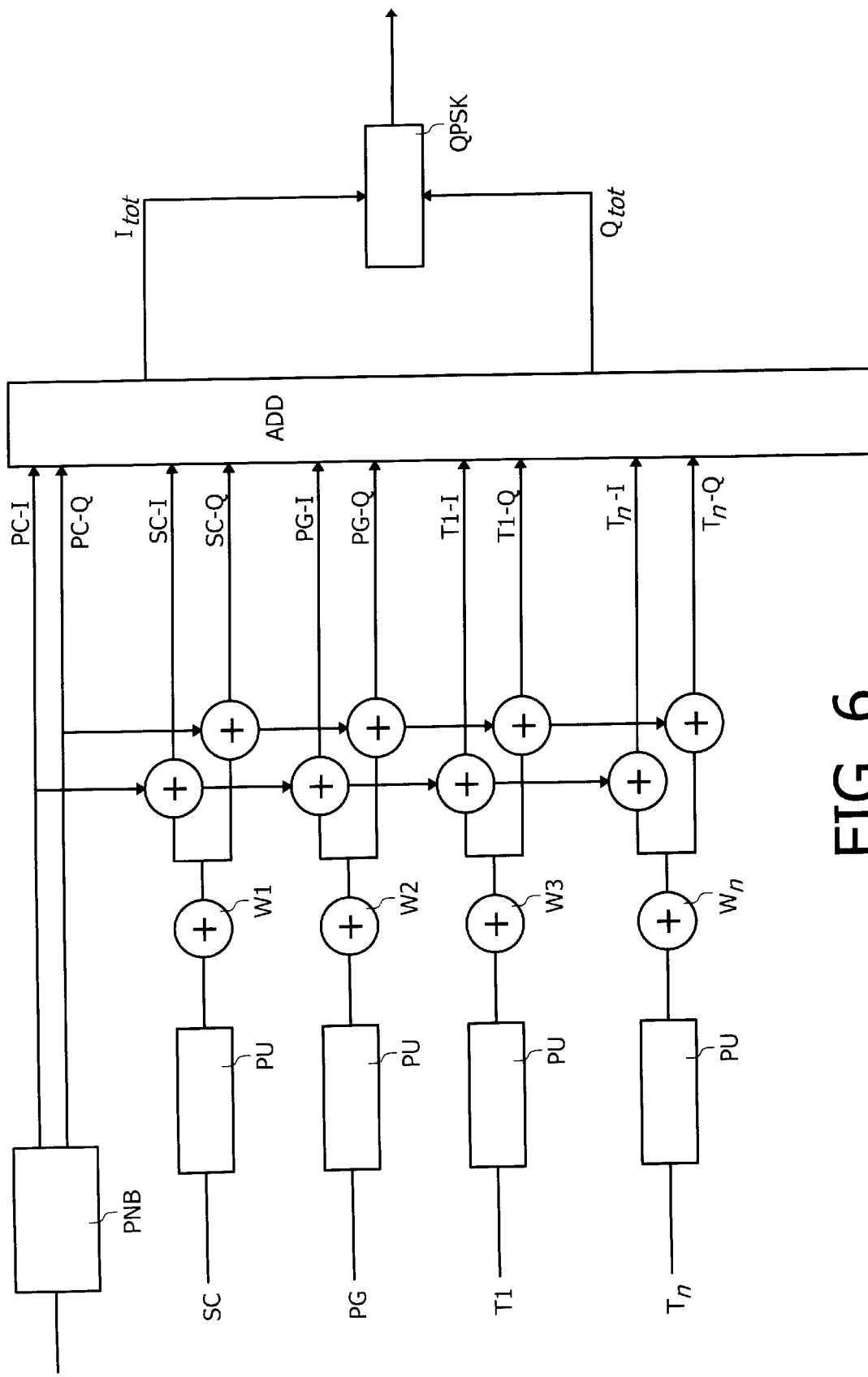
FIG. 6 shows the principles for the signalling from the base station to the mobile terminal according to CDMA signalling.

FIG. 6 shows the principles for generating a downlink signal according to CDMA standards. A pilot channel signal, originating from a pseudonoise code sequence operator board PNB has two components: one in-phase component PC-I and one quadrature phase component PC-Q.

A sync channel signal SC, a paging channel signal PG and a number of traffic channel signals T1, . . . Tn first undergo certain processing, including coding and interleaving, preformed in one or more processing units PU and are then submitted to one of a set of 64 Walsh functions W1, W2, . . . , Wn to make the channels mutually orthogonal. The Walsh functions make the channels completely separable in the receiver and reduces the interference between users in the same cell to substantially zero level.

Each of the signals SC, PG, T1, . . . , Tn is then spread by a short code which has an in-phase (I) and a quadrature (Q) component, to create one I and one Q component, SC-I and SC-Q, PG-I and PGQ, T1-I and T1-Q, and so on. The I and Q components, respectively, of all signals PC, SC, PC, T1, . . . , Tn are then added in an adding unit ADD, to form a signal with one I component $I_{tot}$ and one Q component $Q_{tot}$ which is transmitted from the base station.

Uplink Signalling

The reverse, or uplink, CDMA channel comprises $2^{42}-1$ logical channels, each logical channel being permanently and uniquely associated with each mobile terminal. Each mobile terminal always uses the assigned logical channel when conveying traffic to the base station.

The process of generating a reverse channel signal comprises the following functions:

Coding and interleaving of the information signal

Orthogonal modulation of the signal

Separation of users. Orthogonality is not used to separate the users. Instead a spreading code having a very long period is used. The correlations between the channels thus are not zero, but they are acceptably small.

Spreading. Each reverse CDMA channel is spread both by the channel-unique long code and the short code, which has I and Q components. Thus, the spreading of this signal, like the forward signal, is quadrature.

The two resulting bit streams are vector-modulated onto the carrier wave. The Q component modulation is delayed to reduce the envelop modulation of the carrier wave thus reducing performance requirements on the power amplifiers in the mobile terminals.

Hardware Modifications

According to the invention, to function as a mobile test transmitter, the mobile terminal must be modified so that it can transmit in the receive band of the mobile terminal, in which the base stations normally transmit. In other words, the mobile terminal must transmit in the frequency band, and the signal formats, used for downlink signalling, instead of uplink signalling for which it is adapted.

Using GSM as an example, the mobile terminal must be adapted to transmit at least FCCH and SCH and preferably also BCCH and PCH on the standard downlink frequencies. The FCCH and SCH signals are needed to provide a signal that can be uniquely identified. The BCCH and PCH signals are needed to get another mobile terminal to lock to the signal from the mobile test transmitter automatically. If only FCCH and SCH are used, only the signal power can be measured. To serve as a test cell, the mobile test transmitter must also transmit BCCH and PCH.

In an FDMA system, as well, the frequency band and the control channels transmitted must be changed. In general, the same hardware changes as for a TDMA system must be made. In addition, a duplex filter must be replaced or removed.

In a CDMA system, as well as for TDMA or FDMA, the frequency band would be changed, and the mobile terminal would be adapted to transmit the same control or overhead channels used for downlink signalling, that is, at least one of the pilot channel, the sync channel and the paging channel. This multicode modulation puts higher requirements on the power amplifier in the test transmitter, which may require additional hardware changes.

As an example, for three Ericsson TDMA telephones, GH388, PH388 and CH388, this involves the following hardware modifications:

changing the transmitter oscillator to a new oscillator covering the new frequency band, and removing a resonant circuit to allow for a new internal transmit intermediate frequency.

In some telephones, the receiver may be removed or deactivated to prevent the receiver from loading the transmitter output unfavourably. In Elicsson's mobile telephone for GSM systems, GH388, this is done by removing a coupling capacitor at the receiver input.

In connection with these hardware changes, a few low level software changes must be made to enable the telephone to transmit in the downlink frequency band. In the Ericsson telephones mentioned above this involves the following changes:

The input data to the frequency synthesizer must be changed to correspond to the new transmission frequencies.

The new internal transmit intermediate frequency requires modified programming of the IF ASIC, that is, new values must be programmed to the IF phase locked loop.

To avoid overheating the power amplifier when transmitting on all eight time slots in a TDMA frame, the mobile terminal must also be programmed for a lower maximum output power level, approximately 0.5 W.

A mobile telephone is designed to transmit information in one time slot and be silent for the remaining duration of the frame, which is normally seven slots. When used as a mobile test transmitter, information is preferably transmitted in all eight time slots, so that the total emitted power is increased. It would be possible to transmit only in one of the eight time slots, but using all eight makes it easier for the test devices to detect the signal from the test transmitter and makes signal strength measurements more accurate.

Figure 7A:
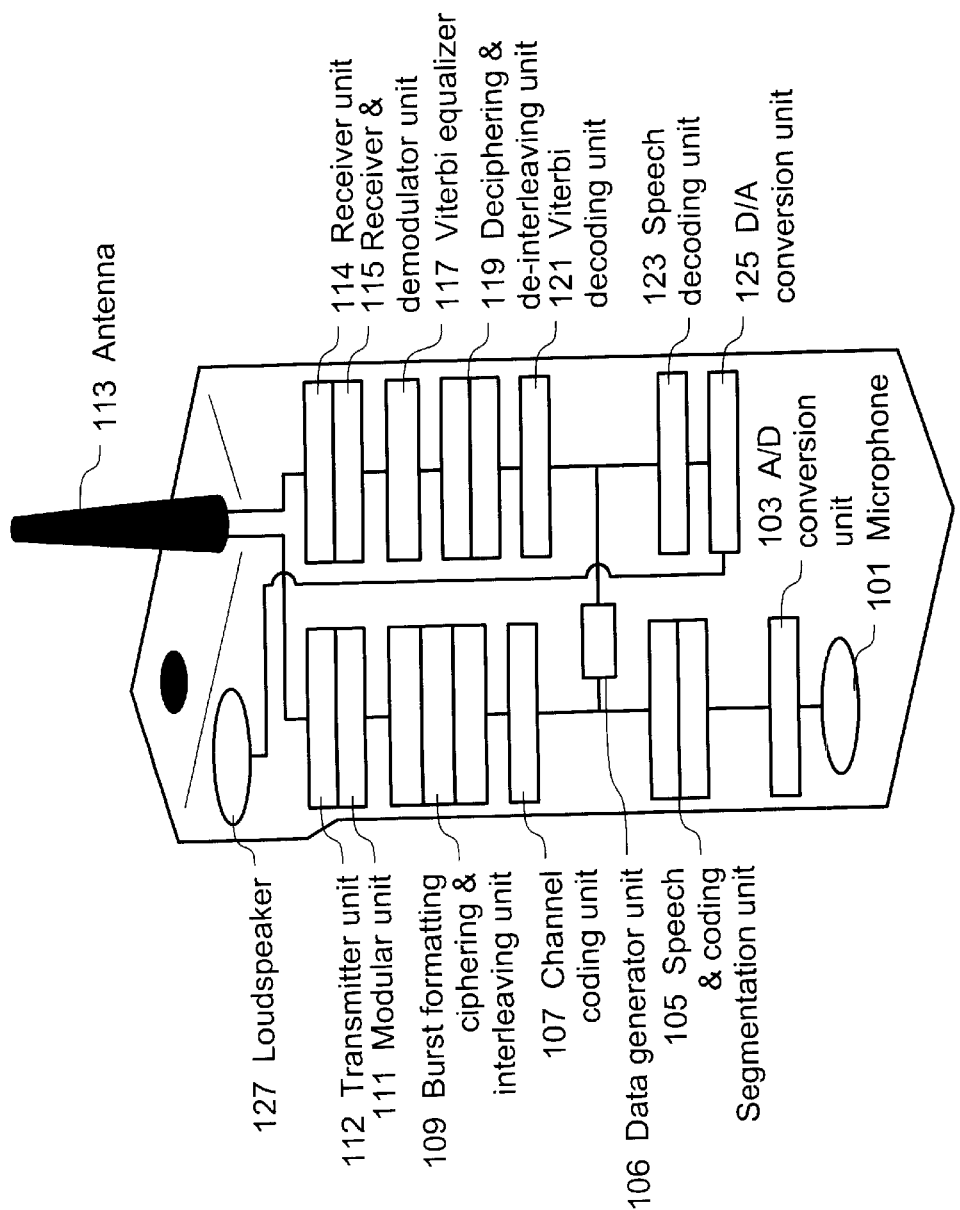
FIG. 7A is a schematic drawing of a mobile telephone with its components.

FIG. 7A is a schematic drawing of a mobile telephone for a TDMA system, with its components. The mobile telephone comprises a transmitting part and a receiving part. The transmitting part comprises a microphone 101, which registers speech.

The microphone 101 is connected to an analogue to digital (A/D) conversion unit 103 which converts the speech to digital form. The A/D conversion unit 103 is connected to a speech coding and segmentation unit 105. A data generator unit 106 is used to generate data, for example for test purposes. The output from the speech coding and segmentation unit 105, or from the data generator unit 106 passes through the channel coding unit 107 to the burst formatting, ciphering and interleaving unit 109. From this unit 109 the data is fed to the modulator unit 111 and then to the transmitter unit 112, which modulates the speech onto a carrier wave. The modulated wave is transmitted through the antenna 113.

In the receiving part a receiver and demodulator unit 115 receives incoming signals from the antenna 113 and retrieves the signal which has been modulated onto the carrier wave. The signal thus retrieved is equalized in the Viterbi equalizer 117 and then deciphered and de-interleaved in the deciphering and de-interleaving unit 119, before it is submitted to Viterbi decoding and speech decoding in a Viterbi decoding unit 121 and a speech decoding unit 123, respectively. The resulting speech coded signal is converted from a digital to an analogue signal a D/A conversion unit 125 and transmitted to the loudspeaker 127. If test data is being received, the data is instead fed from the Viterbi decoding unit 121 to the data generating unit 106.

Figure 7B:
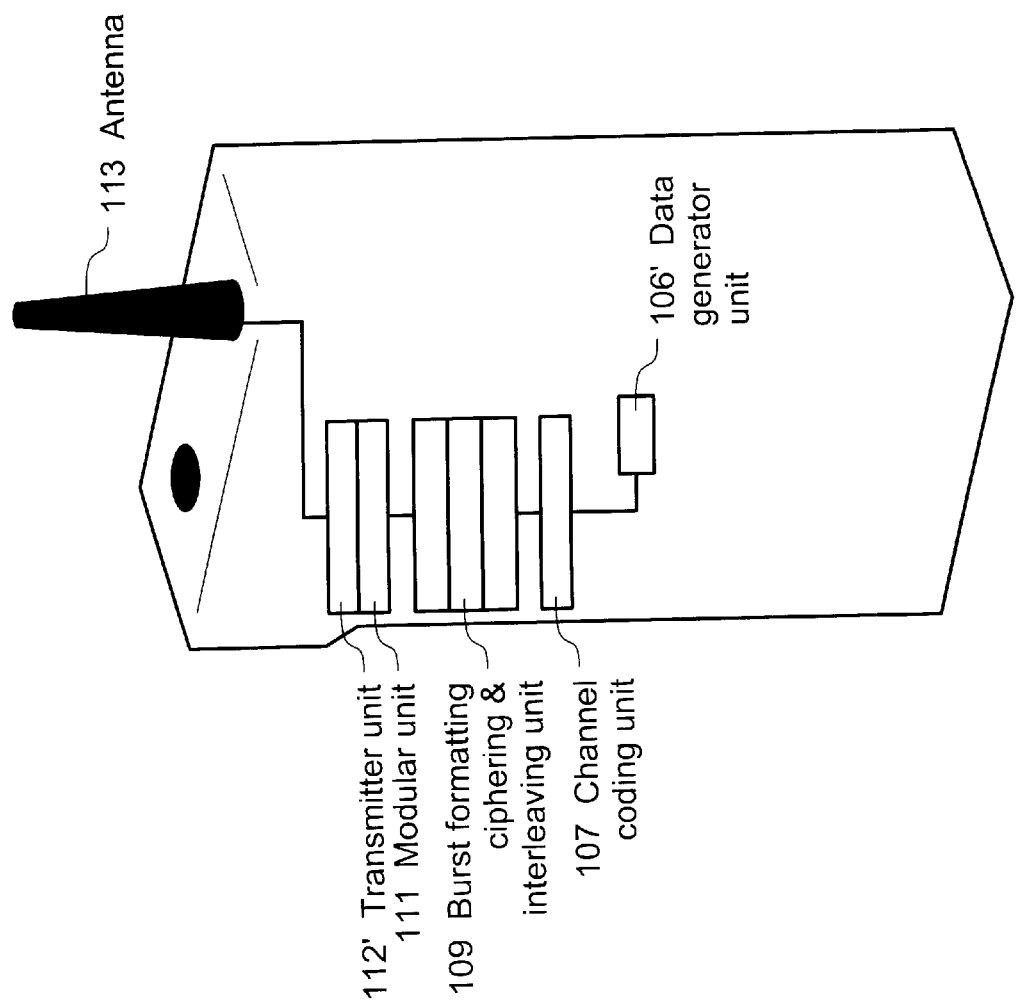
FIG. 7B is a schematic drawing of a mobile telephone modified to become a test transmitter, according to a first embodiment of the invention.

FIG. 7B is a schematic drawing of a mobile telephone modified according to the invention. The entire receiver part, including the receiver unit 114, the demodulator unit 115, the Viterbi equalizer 117, the deciphering and de-interleaving unit 119, the Viterbi decoding 121 and speech decoding 123 units and the D/A conversion unit 125, has been removed or deactivated. In some telephones, the receiver part may have to be removed, as it would otherwise load the output signal unfavourably. In other telephones, it may be sufficient to deactivate the receiver part without removing it.

In the transmitting part, microphone 101, the A/D conversion unit 103 and the segmentation and speech coding unit 105 are not used.

A data stream generated by a data generating unit 106' is instead fed directly to the channel coding unit 107, from where it passes through the interleaving, ciphering and burst formatting unit 109. The data generating unit 106' may comprise the same hardware as the data generating unit 106 of FIG. 7A, but the software must be changed to generate the new kind of data. The units 107, 109 are the same as would be used in a mobile telephone, except that the ciphering function in this context may be omitted. The transmitter unit 112 from FIG. 7A has been replaced by a transmitter unit 112' that is adapted to the downlink transmission frequency band.

A CDMA telephone also comprises a transmitter part and a receiver part performing essentially the same functions as in a TDMA telephone, but adapted to the functions required according to the CDMA standard. For example, instead of the interleaving, ciphering and burst formatting unit 109, a CDMA telephone would comprise an interleaving, ciphering and spreading unit. The changes to be made would be substantially the same as discussed for a TDMA telephone in connection with FIGS. 7A and 7B.

As explained above, in some mobile test transmitters, the receiver part of the mobile telephone may have to be removed. In others, it may be kept and the mobile test transmitter may perform the functions of a mobile test transmitter/receiver.

If the mobile test transmitter comprises a receiver part of the same kind that is normally found in a mobile telephone, this receiver part may be used to receive signals in the downlink frequency band, that is signals transmitted from a base station, or from a test transmitter. These signals may be used to adjust the reference frequency of the mobile test transmitter. This is needed if a test receiver is to be able to receive signals from both the test transmitter and, for example, a base station. In this case, these signals must have a very precise frequency, in order for the receiver to demodulate the signals without a time consuming synchronization procedure for each signal. Mobile telephones do not have the same precision as base stations when selecting a transmit frequency. The signal received from the base station can therefore be used to adjust the frequency of the mobile test transmitter.

The receive function may also be used to detect what channels are already being used by other transmitters, and to select a free channel on which to transmit. Both the frequency adjustment function and the channel selection function require new software compared to what is found in a mobile telephone.

The receiver part may have to be connected when it is to be used and disconnected when the test transmitter is to transmit. Most mobile telephones today have such a transmit/receive switch function, which may be used.

Figure 7C:
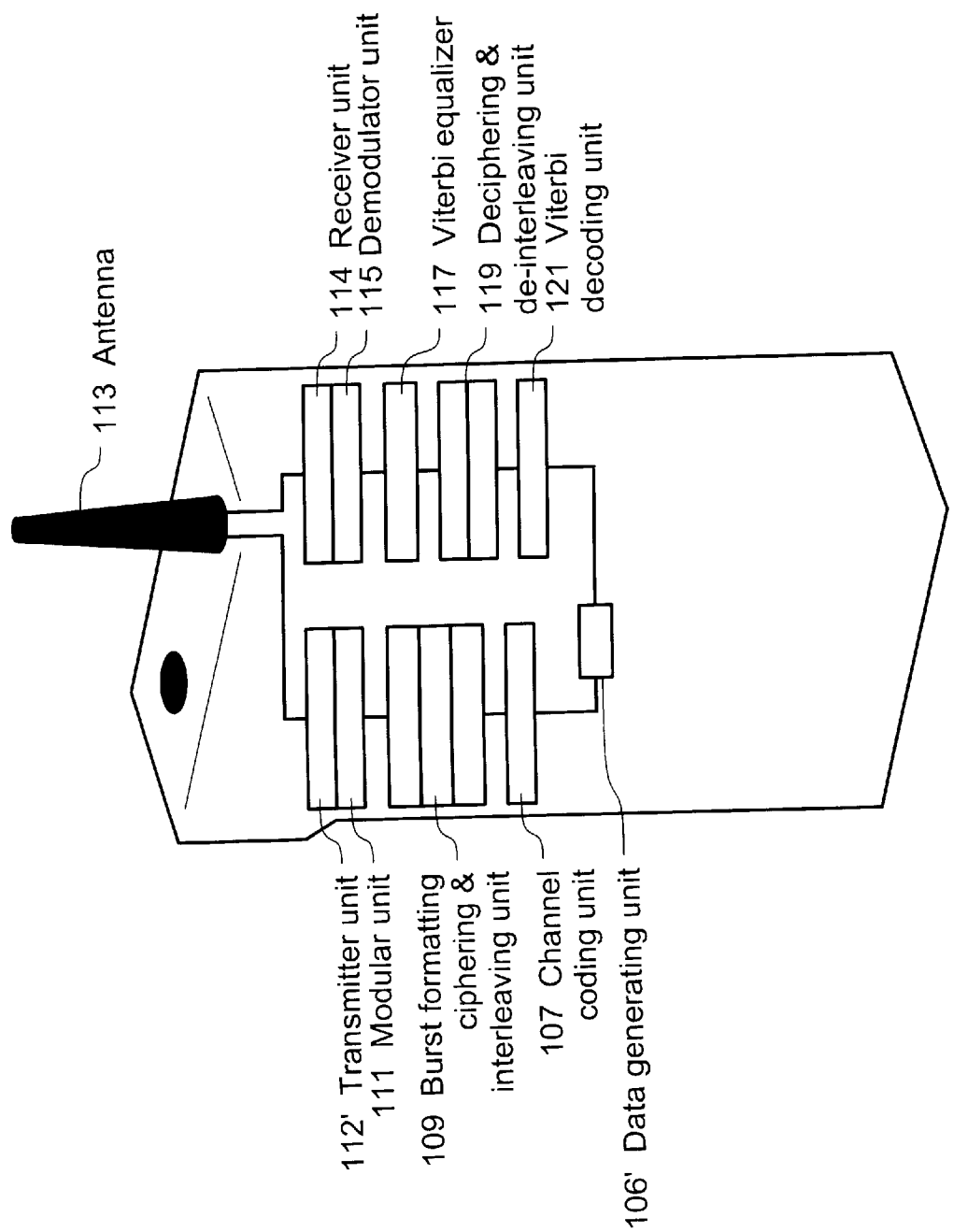
FIG. 7C is a schematic drawing of a mobile telephone modified to become a test transmitter, according to a second embodiment of the invention.

FIG. 7C shows an example of a mobile test transmitter also comprising a receiver part. Again, TDMA is used as an example.

The transmitter part is the same as the one shown in FIG. 7B. A data stream is generated by the data generating unit 106' and fed to the channel coding unit 107, from where it passes through the interleaving, ciphering and burst formatting unit 109. The units 107, 109 are the same as would be used in a mobile telephone, except that the ciphering function in this context may be omitted. The transmitter unit 112' is adapted to the downlink transmission frequency band.

The receiver part comprises a receiver unit 114 which receives incoming signals from the antenna 113 and a demodulator unit 115 and retrieves the signal which has been modulated onto the carrier wave.

The Viterbi equalizer 117, the deciphering and de-interleaving unit 119 and the Viterbi decoding unit 121 may be kept as they are. After Viterbi decoding, the received signal is fed to the data generating unit 106, in which it can be evaluated. The received frequency can, for example be used to set the transmission frequency of the test transmitter, as explained above, or to determine if there are other base stations nearby, and on what channels and frequencies they are transmitting.

The speech decoding unit 123, the D/A conversion unit 125 and the loudspeaker are not needed in this embodiment.

With some modifications, the mobile test transmitter/receiver may be adapted to receive in the uplink frequency band, that is, to receive signals transmitted by mobile telephones. In this case, the receiver unit 114 must be adapted to receive signals in the uplink frequency band, which requires both hardware and software changes. The receiver oscillator and the frequency filters must be replaced by similar units adapted to the new frequency band. The test transmitter may then simulate a speech connection with a mobile telephone or a test transmitter, which makes it a more flexible tool than the test transmitter without the receive function, as described above. More functions may be tested, and more different types of test equipment may be used together with the test transmitter/receiver.

It may also be used to measure traffic density by, for example setting a transmitter to a LAC different than the one used in the rest of the network vicinity. Another possibility is to scan the traffic channel frequencies and time slots of normal network cells and detect traffic by measuring signal strength and/or decoding mobile terminal initiated transmissions.

Software Changes

Practically all the original software functions must be modified. The low level transmit functions are kept the way they are, except the ones described above in connection with the hardware modifications.

A new man-machine interface (MMI) must be designed with new menus for parameter control and for monitoring of the actual setting.

A serial protocol is added to enable the control from a Personal Computer (PC) connected to the mobile test transmitter.

The software for handling the battery may be modified so that it will supervise the battery temperature and only charge the battery when the battery temperature is within certain limits. These modifications are not necessary, but will increase the battery lifetime.

It is possible to configure all the information on the channels used in the test transmissions, provided this functionality is implemented. As an example, some parameters that may be configured in the TDMA systems are:

Absolute Radio Frequency Channel number (ARFCN)
For GSM 900, ARFCN may be given a value between 1 and 124.
For DCS 1800, ARFCN may be given a value between 512 and 885.
For PCS 1900, ARFCN may be given a value between 512 and 810.

Transmit Power (TxPower)
Base Station Identity Code (BSIC)
The value of BSIC may range from 00 to 77 (octal values).
Cell Global Identity (CGI)
MCC, MNC, LAC and CI are configurable. All values possible according to the specifications of the relevant protocol may be used.
Cell Barred
The user may specify that the simulated cell or channel is to be barred, to secure that no standard mobile terminal accidentally camps on a mobile test transmitter during tests and simulations.
Neighbour Cell List
The user may specify the neighbouring cells.

ARFCN and TxPower must be set in order to carry out the invention.

BSIC must be set to create a uniquely identifiable signal.

CGI may be set when the mobile test transmitter is to be used as a test cell. This parameter states the cell identity, the operator, etc.

Cell Barred may be set to prevent ordinary mobile telephones from receiving the signal from the mobile test transmitter, when the mobile test transmitter is to be used as a test cell.

Neighbour Cell List may be set to define the surrounding cells, that is, the neighbour cells that should also be measured by the receiving mobile terminal.

Of course, the mobile test transmitter could be manufactured directly with the oscillator covering the new frequency band and without the receiver and the resonant circuit, and with the new software required, instead of modifying existing mobile telephones.

Because of the relatively low output power of the resulting test transmitter, it is particularly suitable for small areas such as buildings. It is possible to connect other external antennas and a signal amplifier, to vary the range of the mobile test transmitter. In theory, the maximum ranae for GSM 900 is approximately 35 km.

Figure 8:
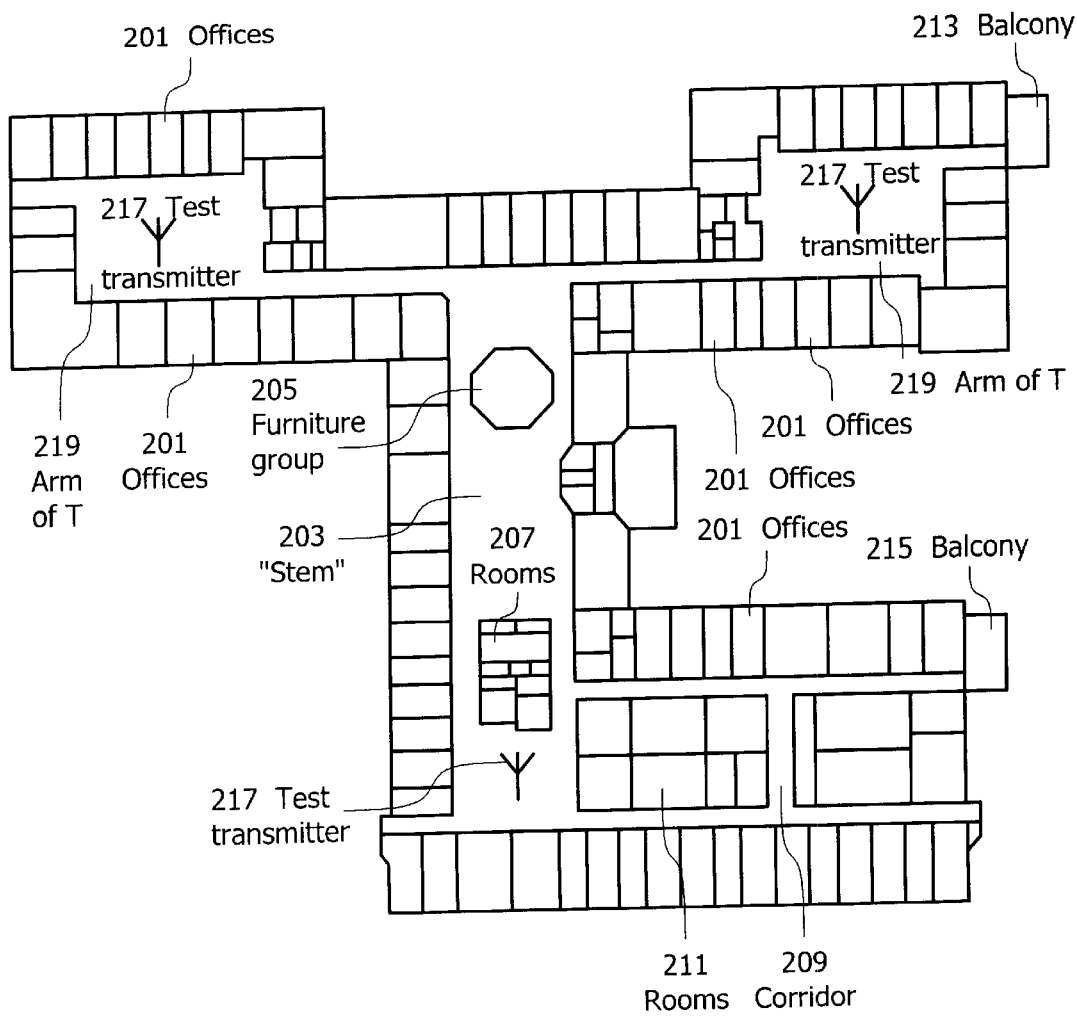
FIG. 8 is a schematic drawing of a building where an antenna configuration is to be tested according to the invention.

FIG. 8 shows one floor of an office building in which an antenna configuration has been planned and is to be tested. This figure is merely intended as an example to illustrate the use of the test transmitter according to the invention. As explained above, any kind of antenna may be used. In this configuration, however, only omnidirectional antennas are used.

The office building shown in the example is roughly T-shaped, with offices 201 of varying size along the outer walls and a corridor in the middle. In the corridor running through the "stem" 203 of the T, there is a group of furniture 205 for coffee breaks or informal meetings and below the furniture group 205 a group of rooms 207, such as lavatories and a cloakroom. From the bottom of the "stem" 203 of the T a corridor 209 extends to one side, likewise with offices 201 along the outer walls and a group of rooms 211 in the middle. There is one balcony 213 at the end of one of the arms, and one 215 at the end of the corridor extending from the stem of the T.

Three test transmitters 217 have been placed on this floor: one in each arm 219 of the T and one near the bottom of the stem.

Figure 9:
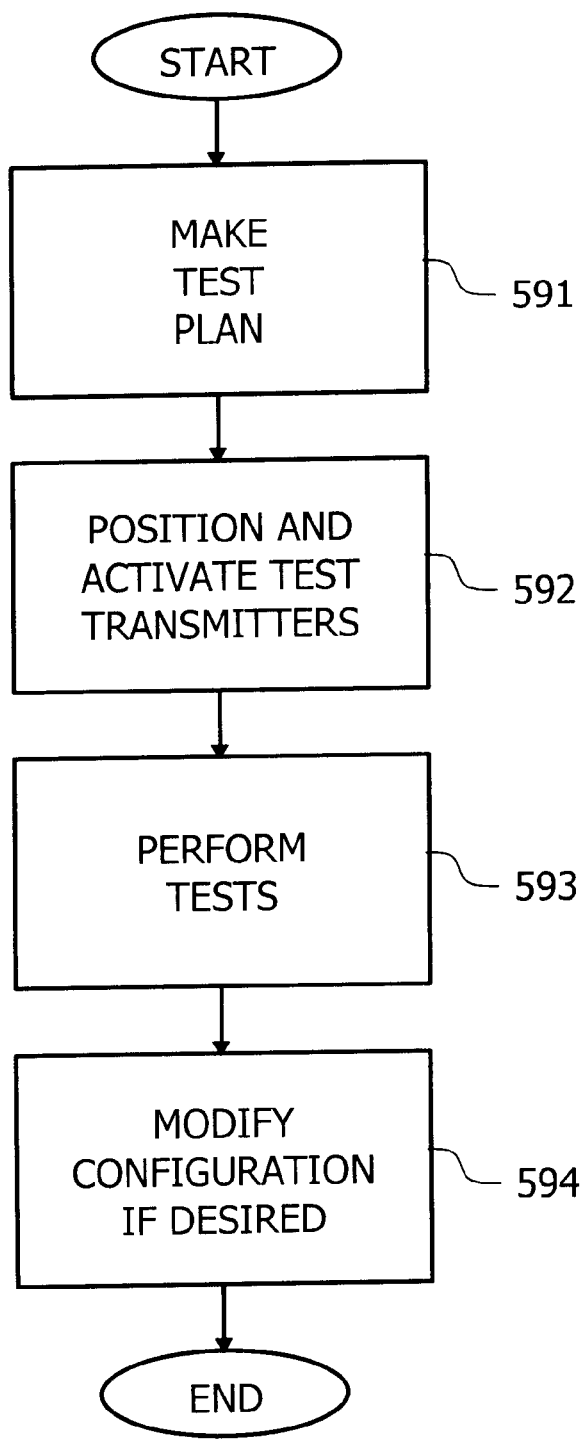
FIG. 9 is a flow chart of the actions needed to test an antenna configuration according to the invention.

FIG. 9 shows the procedure when an antenna configuration, for example the one shown in FIG. 8, is to be estimated and tested according to the invention.

Step S91: A plan is made, estimating the positions in which the antennas should be placed. A prediction tool may be used for an initial test of the configuration.

Step S92: A test transmitter according to the invention is placed in each position where an antenna is foreseen, and activated.

Step S93: The signal power is tested using any test tool known in the art On certain conditions an ordinary mobile telephone may, be used for testing. The test tool used must display the received signal power and the channel number and BSIC of the channel measured. The procedure is simplified if it is possible to lock the test tool to one channel. If this is not possible, the quality and signal level of the test signal must be such that the test tool recognizes the mobile test transmitter as a real cell.

Step S94: According to the test results, test transmitters may be added, moved or taken away until the optimum configuration has been found.

In the above description the teachings of the invention have been disclosed for a mobile test transmitter that may or may not comprise receive functions. As will be obvious to the skilled person, the receive functions may be implemented and used without the transmit functions. The receive functions alone are useful, for example, in measuring traffic density, scanning the traffic channel frequencies and timeslots of normal network cells and detecting traffic by measuring signal strength. They may also be used to decode transmissions initiated by a mobile terminal.

What is claimed is:

1. A test transmitter for a mobile telecommunications system including base stations transmitting in a downlink frequency band and portable units for receiving and transmitting, said portable units transmitting in an uplink frequency band and each including a portable unit casing, a portable unit transmitter part and a portable unit receiver part, said portable unit transmitter part including a portable unit microphone, a portable unit channel coding unit, a portable unit interleaving unit, a portable unit modulator unit, a portable unit transmitter unit adapted to transmit information in the uplink frequency band, and a portable unit antenna, said test transmitter comprising:
   a unit for generating a data stream;
   a portable unit modulator unit; and
   a transmitter unit adapted to transmit the generated data stream in the down link frequency band.

2. The test transmitter according to claim 1, further comprising a portable unit channel coding unit.

3. The test transmitter according to claim 1, further comprising a portable unit channel coding unit.

4. The test transmitter according to claim 1, wherein said transmitter transmits at least one of the modulated signal types normally used for downlink signalling.

5. The test transmitter according to claim 1, wherein said transmitter has an output power limitable to approximately 0.5 W.

6. The test transmitter according to claim 1, wherein said transmitter comprises said portable unit receiver and demodulator unit.

7. The test transmitter according to claim 1, further comprising a portable unit Viterbi equalizer, a portable unit deciphering and de-interleaving unit and/or a portable unit Viterbi decoding unit.

8. The test transmitter according to claim 1, wherein said transmitter is adapted to receive signals in the uplink frequency band.

9. The test transmitter according to claim 1, wherein said transmitter is housed in a portable unit casing.

10. The test transmitter according to claim 1, further comprising a portable unit antenna.

11. The test transmitter according to 1, wherein said transmitter is battery powered.

12. The test transmitter according to claim 1, wherein further comprising a user interface to enable control and supervision of test functions.

13. The test transmitter according to claim 1, wherein further comprising a serial protocol suitable for communication with a computer.

14. The test transmitter according to claim 1, wherein said transmitter is a portable unit that has been modified to function as a test transmitter.

15. A method for manufacturing a mobile test transmitter for a mobile telecommunications system, said mobile telecommunications system including base stations transmitting in a downlink frequency band and portable units for receiving and transmitting, said portable units transmitting in an uplink frequency band and each including a portable unit transmitter part and a portable unit receiver part, said portable unit transmitter part including a portable unit microphone, a portable unit channel coding unit, a portable unit interleaving unit, a portable unit modulator unit, a portable unit transmitter unit adapted to transmit information in the uplink frequency band, and a portable unit antenna, said method comprising the step of modifying one of said portable units so that the one of said portable units can transmit information in the frequency band used for downlink signalling.

16. The method according to claim 15, further comprising the step of modifying the portable unit to transmit at least one of the modulated signal types normally used for downlink signalling.

17. The method according to claim 15, further comprising the step of providing the portable unit with a user interface to enable control and supervision of test functions.

18. The method according to claim 15, further comprising the step of deactivating or removing the receiver part of one of said portable units.

19. The method according to claim 15, further comprising the step of providing the mobile test transmitter with a serial protocol suitable for communication with a computer.

20. A method for manufacturing a mobile test transmitter for a mobile telecommunications system, said mobile telecommunications system including base stations transmitting in a downlink frequency band and portable units for receiving and transmitting, said portable units transmitting in an uplink frequency band and each including a portable unit casing, a portable unit transmitter part and a portable unit receiver part, said portable unit transmitter part including a portable unit microphone, a portable unit channel coding unit, a portable unit interleaving unit, a portable unit modulator unit, a portable unit transmitter unit adapted to transmit information in the uplink frequency band, and a portable unit antenna, said method comprising the steps of:
   connecting a data generator unit to an input of the portable unit modulator unit of one of the portable units;
   connecting an output of said portable unit modulator unit to a transmitter unit adapted to transmit information generated by the data generator in the downlink frequency band; and
   connecting said transmitter unit to the antenna of the one of the portable units.

21. The method according to claim 20, further comprising the step of providing a portable unit channel coding unit and/or a portable unit interleaving unit between the data generator unit and the portable unit modulator unit.

22. The method according to claim 20, further comprising the steps of providing a portable unit receiver and modulator unit, a portable unit Viterbi equalizer, a portable unit deciphering and de-interleaving unit and a portable unit Viterbi decoding unit.

23. The method according to claim 21, further comprising the steps of providing a receiver and modulator unit adapted to the uplink frequency band, a portable unit Viterbi equalizer, a portable unit deciphering and de-interleaving unit and a portable unit Viterbi decoding unit.

24. The method according to claim 20, further comprising the step of assembling the units comprised in the test transmitter in one of said portable unit casing.

25. The method according to claims 20, further comprising the step of connecting the transmitter unit to a said portable unit antenna.

26. The method according to claim 20, further comprising the step of providing the portable unit with a user interface to enable control and supervision of test functions.

27. The method according to claim 20, further comprising the step of providing the portable unit with a serial port and a serial protocol suitable for communication with a computer.

28. A method for manufacturing a mobile test transmitter for determining antenna positions in an indoor distributed antenna system of a mobile telecommunications system and for testing an entire antenna configuration of the mobile telephone system in one operation, the mobile telecommunications system including base stations transmitting in a downlink frequency band and portable units for receiving and transmitting, said portable units transmitting in an uplink frequency band and each including a portable unit casing, a portable unit transmitter part and a portable unit receiver part, the portable unit transmitter part including a portable unit microphone, a portable unit channel coding unit, a portable unit interleaving unit, a portable unit modulator unit, a portable unit transmitter unit adapted to transmit information in the uplink frequency band, and a portable unit antenna, the method comprising the steps of:

connecting a data generator unit to an input of the portable unit modulator unit of one of the portable units;

connecting an output of the portable unit modulator unit to a transmitter unit adapted to transmit information generated by the data generator in the downlink frequency band; and connecting the transmitter unit to the antenna of the one of the portable units.

* * * * *